United States Patent [19]

Shaffer

[11] 3,878,340

[45] Apr. 15, 1975

[54] RING TRIP CIRCUIT EMPLOYING A FILTER NETWORK AND A SOLID STATE DEVICE EXHIBITING ELECTRICAL ISOLATION

[75] Inventor: William E. Shaffer, Rochester, N.Y.

[73] Assignee: Stromberg-Carlson Corporation, Rochester, N.Y.

[22] Filed: Dec. 29, 1972

[21] Appl. No.: 319,270

Related U.S. Application Data

[63] Continuation-in-part of Ser. No. 255,544, May 22, 1972, Pat. No. 3,839,603.

[52] U.S. Cl. .......................... 179/18 HB; 179/84 A

[51] Int. Cl. ............................................ H04m 3/04

[58] Field of Search ......... 179/18 FA, 18 HB, 84 A, 179/84 R, 81 R

[56] References Cited

UNITED STATES PATENTS

| | | | |
|---|---|---|---|
| 2,495,511 | 1/1950 | Dolberg | 178/44 |
| 2,996,689 | 8/1961 | Janz | 333/75 |
| 3,187,106 | 6/1965 | Steinmetz | 179/18 HB |
| 3,689,700 | 9/1972 | Lent | 179/16 F |
| 3,746,798 | 7/1973 | Thomas | 179/18 HB |
| 3,748,391 | 7/1973 | Shaffer | 179/84 R |
| 3,766,325 | 10/1973 | Hatfield et al. | 179/84 A |

*Primary Examiner*—Thomas W. Brown
*Attorney, Agent, or Firm*—William F. Porter, Jr.

[57] ABSTRACT

A filter network is used in a telephone ring trip circuit to prevent AC ringing signals from being applied to a solid state device exhibiting electrical isolation, used in place of the customary ring trip relay, while permitting DC current to be so applied.

7 Claims, 3 Drawing Figures

RING TRIP CIRCUIT EMPLOYING A FILTER NETWORK AND A SOLID STATE DEVICE EXHIBITING ELECTRICAL ISOLATION

This is a continuation-in-part of a copending application (Ser. No. 255,544) filed on May 22, 1972, now U.S. Pat. No. 3,839,603, entitled, "Ring Trip Circuit Employing A Filter Network" on behalf of the same applicant and assignee as the present application.

BACKGROUND OF THE INVENTION

The invention disclosed herein pertains to telephone ring trip circuits and in particular to a circuit designed to function with heavy ringing loads.

Ring trip circuits, as is well known, are used in telephone systems for detecting when a telephone call is answered to provide a means in response thereto for removing the ringing signals from the telephone line. Until a call is answered on AC signals, such as the ringing signals, can flow between the telephone switching system and the telephone instrument connected to the telephone line. Once a call is answered by lifting of the telephone handset, a loop is completed through the telephone instrument for the flow of DC current from a battery usually connected in series with the ringing generator and the telephone line. It is the flow of this DC current which provides an indication that the call has been answered.

The ring trip circuit which is connected between the ringing generator and the telephone line is ideally designed to be responsive to DC current but not the AC ringing signals. Consequently the ring trip relay commonly used in the ring trip circuit is actuated only by the DC current when a telephone call is answered to provide control supervision for disconnecting the ringing generator from the telephone line at that time. Unfortunately with the present designs this relay is sometimes operated improperly before a telephone call is answered. As a result the ringing signal is terminated prematurely, sometimes very quickly so that the called party may not even have heard the ring or if the signal was heard before termination, the called party might think that the call was intentionally abandoned and not bother to answer it. In either case this is a highly undesirable situation since it confuses and inconveniences telephone customers and in addition unnecessarily burdens the telephone switching system since equipment previously used must be used once again if the caller wishes to get through to the called party. Once the ringing signal is terminated it can only be restored by dialing the same telephone number again.

The foregoing problem, commonly referred to as premature ring trip, is caused quite often by the connection of multiple telephone instruments to a single telephone line so that the ringing signal applied to the line actuates more than one signalling device (such as a ringer). The simultaneous operation of a number of signalling devices creates heavy ringing loads sometimes drawing AC ringing current which exceeds the level above which the ring trip relay is no longer insensitive so that the relay is actuated thereby. For instance, a typical ring trip scheme employs a dual coil relay wherein the two windings are connected in parallel, arranged so that AC current flowing therethrough produces equal and opposite magnetic flux fields which cancel each other, causing the relay to remain unoperated. The ring trip circuit is designed so that when a DC loop is completed more DC current flows through one relay winding than the other which creates sufficient net flux due to the current unbalance to operate the relay. Because of manufacturing tolerances, ring trip circuits cannot be designed to completely cancel out the two flux fields produced by the AC current flow through both relay windings. With small ringing loads the resultant flux unbalance is likewise small being insufficient to operate the relay and premature ring trip is no problem. With increasing ringing loads however, the AC flux unbalance becomes pronounced and may attain a level sufficient to operate the ring trip relay. The greater the ringing load the greater the possibility of premature ring trip.

Although ring trip relays could be made less sensitive to current to avoid the premature ring trip problem caused by large AC ringing currents this is not a desirable solution since a relay would then also be less sensitive to DC current and would be slow to operate after a call is answered. A much more desirable solution entails an approach wherein the ring trip relay is not made insensitive to AC signals passing therethrough but rather is connected in a ring trip circuit so that AC signals cannot be applied to its terminals. In this configuration the magnitude of the AC ringing current is of no consequence since it does not pass through the ring trip relay and therefore cannot possibly operate it prematurely.

Another problem encountered not only in ring trip circuits but in the telephone art generally is the integration of new solid state logic and switching circuits into circuit designs employing standard proven electromechanical devices such as relays. The continuing use of electromagnetic relays prevents taking full advantage of the miniaturization and cost savings afforded by total solid state circuitry since these relays occupy substantially greater space and cost more than equivalent electronic devices particularly with regard to mass production manufacturing and assembly costs associated with printed circuit boards which are now very common. Accordingly, it would be highly desirable to replace the standard ring trip relay with a solid state electronic device capable of high speed operation for detecting DC current in a telephone line for providing a signal in response thereto to a control circuit and which provides electrical isolation from the telephone line so that high voltage transients in the line cannot damage sensitive solid state components in the control circuit.

With the foregoing in mind, it is an object of the present invention to provide a new and improved telephone ring trip circuit.

It is a further object of the present invention to provide a new and improved ring trip circuit designed to function with heavy ringing loads without the occurrence of premature ring trip.

It is still a further object of the present invention to provide a new and improved ring trip circuit wherein DC current is applied through a solid state device exhibiting electrical isolation used in place of a standard ring trip relay while AC ringing signals are prevented from being so applied.

BRIEF DESCRIPTION OF THE INVENTION

The telephone ring trip circuit of the invention utilizes a filter network which permits DC current to be applied through a solid state device exhibiting electrical isolation but prevents AC signals having a particular frequency corresponding to the ringing signal from being so applied. The AC ringing signals and battery potential are applied to a telephone line through the input terminals of the network while the device is connected directly across its output terminals. The characteristics of the network are such that the AC signals passing through the network via a path which blocks DC signals produce very little, if any AC signal across its output terminals so that a DC load connected thereacross passes substantially no AC current. In this configuration the device responds only to the flow of DC current when a call is answered and will not operate prematurely on ringing current.

In the specific embodiment disclosed the device is an optoelectronic coupler and the filter network comprises a pair of resistance-capacitance T networks connected in parallel. The ringing generator and battery are connected in series with the telephone line between the terminal leading to the middle leg of the T networks and one of the other terminals. The optoelectronic coupler is connected across the middle leg terminal and the other remaining terminal. The parallel-T resisance-capacitance network has well known characteristics for accomplishing the desired ring trip circuit operation.

An additional feature of the invention provides circuit means connected directly across the input terminals of the filter network to provide a low impedance AC path between the ringing generator and the telephone line to ensure adequate ringing current for operating a plurality of signalling devices.

The same element in different figures is identified by the same reference designation throughout the drawings.

DETAILED DESCRIPTION OF THE INVENTION

Figure 1:
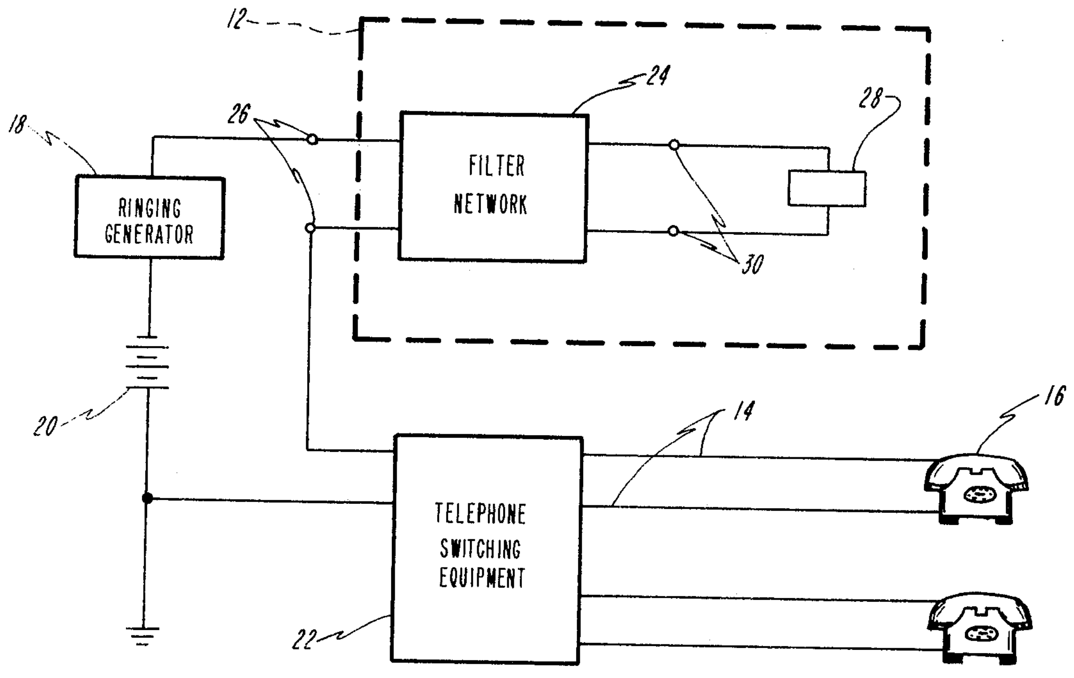
FIG. 1 illustrates how the filter network is to be connected in a ring trip circuit employing a standard ring trip relay.

FIG. 1 shows a ring trip circuit 12 connected in a telephone series ringing circuit defined by a telephone line 14 interconnecting a telephone instrument 16 with a ringing generator 18 and a battery 20 through telephone switching equipment 22. Although only one telephone instrument 16 is shown connected to the telephone line 14 it is understood that any number of such telephone instruments could be connected thereto. The ring trip circuit 12 comprises a filter network 24 having two input terminals 26, through which AC ringing signals are applied to the telephone line 14 by the ringing generator 18 to operate a signalling device in the telephone instrument 16 indicating a telephone call on the line 14 and through which DC current flows from the battery 20 when the call is answered upon lifting of the telephone handset. A ring trip relay 28 is connected across two output terminals 30 of the filter network 24 for energization by the DC current to actuate contacts (not shown) in the telephone switching equipment 22 which disconnect the ringing generator 18 from the telephone line 14 and connect the latter to the telephone line over which the call was originated to complete a talking path between the calling and called stations. The switching equipment 22 is used to connect the ringing generator 18 to any one of the telephone lines over which ringing signals are to be applied and to complete a talking path connection once the call is answered.

The characteristics of the filter network 24 are such that DC current flowing between its input terminals 26 must also pass through both its output terminals 30 when a DC load is connected thereacross while AC signals of a predetermined frequency pass between the input terminals 26 without producing any signal across the output terminals 30. If the predetermined frequency referred to corresponds to that of the AC ringing signals then the ring trip relay 28 cannot be tripped prematurely on ringing current since the filter network 24 prevents the ringing signals but not the DC current from being passed through the relay 28. This is the underlying principle of the invention.

Figure 2:
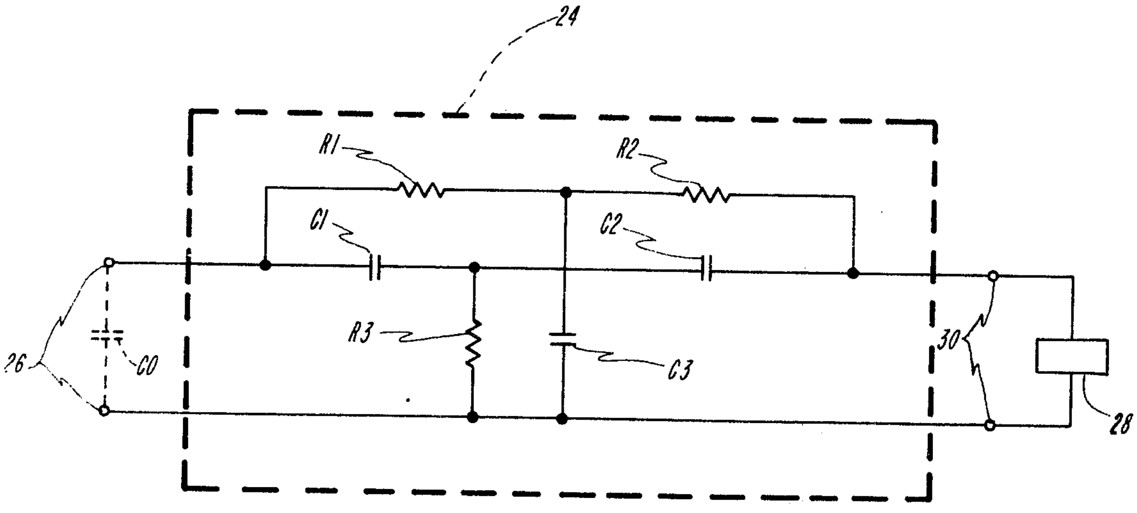
FIG. 2 illustrates a specific embodiment of the ring trip circuit of FIG. 1 utilizing a parallel-T resistance-capacitance network.

One well known filter network having the desired aforementioned characteristics is the parallel-T resistance-capacitance network shown in FIG. 2. This network comprises two T networks arranged in parallel by connecting corresponding terminals of each together. One T network consists of resistors R1, R2 and capacitor C3 while the other T network consists of capacitors C1, C2 and resistor R3. The termnal leading to the middle leg of each T network is common to both the input 26 and output 30 terminals of the network 24. Resistors R1, R2 and R3 and capacitors C1, C2 and C3 are chosen to satisfy the equations for the parallel-T network so that a null point is achieved at the output terminals 30 for AC signals having a frequency corresponding to the frequency of the AC ringing signals applied through the input terminals 26. These equations are well known and can be referred to in a number of I.R.E. technical papers such as "The Parallel-T Resistance-Capacitance Network" by Laurence G. Cowles which appeared in the December, 1952 issue of the Proceedings of the I.R.E. and "Analysis of a Resistance-Capacitance Parallel-T Network and Applications" by A. E. Hastings which appeared in the March 1946 issue. The resistors R1 and R2 and the capacitors C1 and C2 can be made equal to one another if a symmetrical network is desired or these components can be made unequal to meet various system requirements.

AC ringing current enters one of the input terminals 26 of network 24 and exits from the other terminal after having passed through the combination of resistors and capacitors. Because of the design characteristics this current produces a null across output terminals 30 so that no portion of the current flows therebetween via the relay 28. It is realized that filter networks such as the parallel-T resistance-capacitance network are subject to manufacturing tolerances so that as a practical matter they cannot completely eliminate AC signals at their output terminals and some current will invariably pass therebetween through the connected load. However, their design is flexible enough so that with the judicious selection of component values substantially no AC signal will be produced at the output terminals. Actual tests reveal that the level of ringing current passing between the network input terminals can be attenuated by as much as 99 percent at the output terminals leaving little if any current to produce sufficient flux to operate the ring trip relay even under the heaviest ringing load conditions such as the simultaneous operation of twenty ringers. Yet all the steady state DC current flows through the relay so that there is sufficient flux under this condition to cause the relay to operate.

With regard to DC current applied to the input terminals 26 the only path in the network 24 available for the flow of this current is the series combination of resistors R1 and R2 and the ring trip relay 28 once the capacitors have been charged and steady state has been achieved. The charging times are designed to be fast so as not to unduly delay the response of the relay 28 once a call is answered.

Connection of the filter network 24 in series with a telephone ringing circuit may introduce an AC impedance which reduces the ringing current below some minimum acceptable level necessary for operating the connected signalling devices. If this is so, AC circuit means such as capacitor CO can be placed directly across the input terminals 26 of the network 24 to provide a low AC impedance path between the ringing generator 18 and the telephone line 14 to ensure adequate ringing current. This shunt path permits AC ringing signals to be transmitted therethrough but blocks the DC current so that the sensitivity of the ring trip relay 28 is not impaired. Furthermore the shunt path does not alter the characteristics of the network so that it performs as already described. One combination of values which was found to provide very good performance with ringing signals having a frequency of 20HZ is the following:

R1 = 918 ohms, R2 = 459 ohms, R3 = 458 ohms,
C1 = 10 microfarads, C2 = 10 microfarads,
C3 = 30 microfarads and CO = 50 microfarads It should be noted that in view of the low frequency of the AC ringing signal (20HZ being typical) the component values necessary to achieve the desired results are relatively small, thereby permitting components of small physical size to be used in the ring trip circuit, an important consideration in light of the prevalence of printed circuit cards in today's telephone market.

Figure 3:
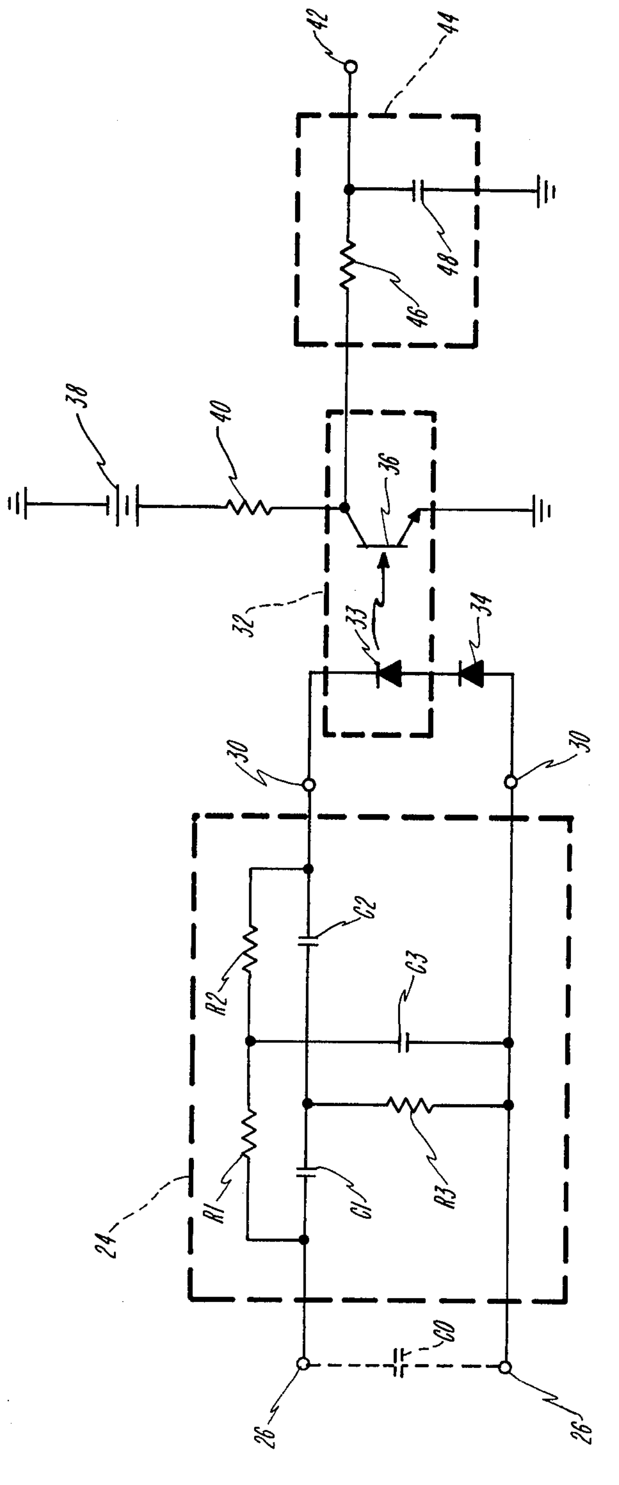
FIG. 3 illustrates the specific embodiment of FIG. 2 with an optoelectronic coupler replacing the standard ring trip relay.

To take further advantage of small size components which are readily adaptable to printed circuit card technology, the ring trip relay 28 is replaced with a solid state device exhibiting electrical isolation, such as the opotoelectronic coupler 32 shown in FIG. 3, all the other ring trip circuit connections being the same as already described with respect to FIGS. 1 and 2. The optoelectronic coupler, which is well known in the electronics art and may be referred to in a number of sources including an article in the June 28, 1963 edition of Electronics Magazine at pages 32–34, entitled, "Look At What Optical Semiconductors Do Now" by Richard F. Wolff, displays the necessary characteristics for providing a solid state alternative to the ring trip relay. The coupler 32 consists of a light emitting diode 33 connected across the output terminals 30 preferably through a diode 34 which protects the diode 33 from possible large reverse voltages and a phototransistor 36 whose base is open circuited and whose collector-emitter path is connected in series with a battery 38 and a current limiting resistor 40. The collector output of phototransistor 36 is applied to a terminal 42, adapted for connection to a control circuit (not shown) in the telephone switching equipment 22 (FIG. 1) for initiating control operations therein when a call is answered, through a delay circuit 44 consisting of, for example, a resistor 46 and a capacitor 48.

Before a call is answered there is no current flowing through the light emitting diode 33 (no path is present yet for DC current and the filter network 24 eliminates AC current therethrough) so that phototransistor 36 is cut off and a high signal, equal to the battery 38 potential appears at terminal 42. When a call is answered, the resultant flow of DC current through the light emitting diode 33 causes it to produce a radiation signal which is applied to the phototransistor 36 to drive it into saturation, thereby producing a ground signal at terminal 42 indicating that the call has been answered.

The radiation signal is proportional to the magnitude of current through the light emitting diode 33 while the conductivity state of phototransistor 36 is a function of the radiation signal applied thereto. Consequently the optoelectronic coupler 32 is designed so that the phototransistor 36 is saturated by a radiation signal generated in response to the minimum expected DC loop current (normally corresponding to the longest telephone line to be rung).

Because of the extremely rapid response time of the optoelectronic coupler 32 (in the order of microseconds) it is desirable to provide a delay circuit such as 46 to prevent false operations which might otherwise be triggered as a result of transient signals in the telephone system, particularly in the telephone line being rung. By the judicious selection of elements, the time delay introduced by the delay circuit can be made long enough to render the output signal at terminal 42 insensitive to transients yet short enough so as not to unduly delay the ring trip operation. The electrical isolation between the light emitting diode 33 and the phototransistor 36 (in the order of 1500 volts or more) provides the important insulation necessary for preventing large transient signals from being applied to sensitive solid state control circuitry in the telephone switching equipment 22 which might otherwise create severe problems, including equipment damage. Thus the characteristics of the optoelectronic coupler make it an ideal solid state substitute for the standard ring trip relay.

The use of a solid state device such as an optoelectronic coupler to replace the standard ring trip relay in a ring trip circuit permits the full realization of the advantages afforded by printed circuit board technology including space and cost savings.

The use of a filter network to eliminate the need in ring trip circuits to distinguish between AC and DC currents provides a facile and economical solution to the premature ring trip problem. The specific embodiment disclosed herein comprising a parallel-T resistance-capacitance network and an optoelectronic coupler is in no way intended to exclude the application to ring trip circuits of our other types of filter networks and solid state devices having the desired characteristics to accomplish the objects previously set forth since these other networks may also be used in ring trip circuits without departing from the scope and spirit of the invention as claimed hereinafter.

What is claimed is:

1. A ring trip circuit for use in a telephone series ringing circuit, the series circuit including a telephone line, at least one telephone instrument connected thereto, a ringing generator for providing AC ringing signals to operate a signalling device in the telephone instrument to indicate a telephone call on the line and a battery for providing a DC current when the call is answered, comprising an optoelectronic coupler having an input circuit for producing a signal proportional to the current therethrough and an output circuit electrically isolated from said input circuit whose conductivity state is a function of said signal, a delay circuit connected across the output circuit of the optoelectronic coupler and a parallel-T resistance-capacitance network having a first pair of terminals for connection in the series circuit and a second pair of terminals for connection to said input circuit, said network providing two current paths, one for passing the ringing signals while blocking DC current and the other for passing DC current through said input circuit to the substantial exclusion of the ringing signals.

2. The ring trip circuit of claim 1 including circuit means connected across said first pair of terminals to provide a low impedance AC path therebetween.

3. The ring trip circuit of claim 2 wherein said circuit means is a capacitor.

4. The ring trip circuit of claim 1 wherein said filter network comprises a pair of T networks connected in parallel, each having first, second and third terminals, the second terminal of each leading to the middle leg of the T network, arranged so that said first and second terminals constitute said first pair of terminals of said filter network and said second and third terminals constitute said second pair of terminals of said filter network.

5. The ring trip circuit of claim 1 wherein a first one of said pair of T networks consists of a capacitor in its middle leg and resistors in its other two legs and the other one of said pair of T networks consists of a resistor in its middle leg and capacitors in its other two legs.

6. The ring trip circuit of claim 5 including a capacitor connected across said first and second terminals to provide a low impedance AC path therebetween.

7. A ring trip circuit for use in a telephone series ringing circuit, the series circuit including a telephone line, at least one telephone instrument connected thereto, a ringing generator for providing AC ringing signals to operate a signaling device in the telephone instrument to indicate a telephone call on the line and a battery for providing a DC current when the call is answered, comprising:

an optoelectronic coupler having an input circuit for producing a signal proportional to the current therethrough and an output circuit electronically isolated from said input circuit whose conductivity state is a function of said signal;

a delay circuit connected across the output circuit of the optoelectronic coupler;

a filter network having a first pair of terminals for connection in the series circuit and a second pair of terminals for connection to said input circuit, said network providing two current paths, one for passing the ringing signals while blocking DC current and the other for passing DC current through said input circuit to the substantial exclusion of the ringing signal, and a capacitor connected across said first pair of terminals to provide a low impedance AC path therebetween;

said filter network comprising a pair of T networks connected in parallel each having first, second, and third terminals, the second terminal of each leading to the middle leg of the T network, arranged so that said first and second terminals constitute said first pair of terminals of said filter network and said second and third terminals constitute said second pair of terminals of said filter network, the first of said pair of T networks consisting of a capacitor in its middle leg and resistors in its other two legs, and the other one of said pair of T networks consisting of a resistor in its middle leg and capacitors in its other two legs.

* * * * *